(12) United States Patent
Saito

(10) Patent No.: US 6,561,910 B1
(45) Date of Patent: May 13, 2003

(54) METHOD FOR CONTROLLING CHARACTER BASED ELECTRONIC GAME DEVELOPMENT

(75) Inventor: Mikio Saito, Tokyo (JP)

(73) Assignees: Konami Corporation (JP); KCE Tokyo Inc. (JP)

( * ) Notice: Subject to any disclaimer, the term of this patent is extended or adjusted under 35 U.S.C. 154(b) by 0 days.

(21) Appl. No.: 09/627,745

(22) Filed: Jul. 28, 2000

(30) Foreign Application Priority Data

Aug. 3, 1999 (JP) .......................................... 11-220521

(51) Int. Cl.[7] .......................... G06F 17/00; A63F 13/00
(52) U.S. Cl. ........................................... 463/43; 463/31
(58) Field of Search ................................ 463/1, 30–35, 463/37–38, 43–44, 4; 273/148 B, 108.1–108.4, 429–431, 161, 461; 434/236–238, 307 R

(56) References Cited

U.S. PATENT DOCUMENTS 5,393,071 A * 2/1995 Best ............................. 463/35
6,259,431 B1 * 7/2001 Futatsugi et al. ............ 345/157
6,290,565 B1 * 9/2001 Galycan, III et al. ......... 446/99

OTHER PUBLICATIONS

A magazine entitled "Game Walker", published Dec., 1995.
A magazine entitled "Game Walker", published May, 1996.
A magazine entitled "Official Guide Book–Dragon Quest III", published Feb. 2, 1997.

* cited by examiner

*Primary Examiner*—Kim Nguyen
(74) *Attorney, Agent, or Firm*—Bachman & LaPointe, P.C.

(57) ABSTRACT

A game-development control method divides a game scenario into an introductory part including at least one pre-event and a subsequent main part including at least one event correlated with the one pre-event. When each pre-event is generated in the introductory part, pre-event generation data generated based on the generation of each pre-event are recorded on a recording medium. When each event is generated, pre-event generation data correlated to each event are read among the pre-event generation data recorded in the recording medium, and the read pre-event generation data are reflected in the contents of each event.

8 Claims, 6 Drawing Sheets

METHOD FOR CONTROLLING CHARACTER BASED ELECTRONIC GAME DEVELOPMENT

BACKGROUND OF THE INVENTION

1. Field of the Invention

The present invention relates to video games, and in particular, to technology for realizing a simulation video game which displays, in accordance with a game scenario, a plurality of mate characters or phenomena relating to a player character manipulated by a game player, and in which a game based on a game scenario particularly related to human relations develops in accordance with operations by the game player.

2. Description of the Related Art

There are simulation video games in which a game player manipulates a player character to have a conversation with a plurality of mate characters displayed on a display and in which the game player changes the characteristics of the player character so that human relations between the player character and each mate character can change. The game player enjoys the change in the human relations. These video games are realized as, for example, love-simulation games, which are popular in that a game player can enjoy virtual love with a mate character having responses similar to a real person.

This type of video game has entertaining features in that the game player can enjoy the subtlety in human relations. Accordingly, the entertaining features are greatly influenced by the settings of the player character, a human relation between the player character and each mate character, and the surroundings. In general, the settings are determined differently for each mate character in order that the entertaining features may be enhanced and developments in the game may be diverse. For example, a technique is often used in which, by using a setting in which a player character and a mate character know each other, the game story can have interesting developments.

When such a technique is used in conventional love-simulation games, in many cases, the acquaintanceship between the player character and the mate character is described after an event. This may cause the game player to lose interest when playing the game. In general, this problem exists not only in the love-simulation games but also in games having scenario-based developments through conversations between a player character and a mate character. Accordingly, a technique is in demand which enables the game player to recognize the inevitability of developments in the scenario, including the relationship between the player character and the mate character, more naturally.

In the games of the above-described type, a change in the characteristics of the player character often changes responses of the mate character to the player character. However, there is a case where initial values of personality factors relating to the characteristics of a player character, and in particular to a plurality of player characters, are only preset. In this case, the game player may be hindered from emphathizing with the player character. Although a technique is also employed which can determine initial values of personality factors by setting the initial values to reflect the personality of the game player, a process relating to the determination of the initial values may hinder the operation of the game scenario. Therefore, it is also difficult for this technique to enable easy empathy of the game player with the player character.

SUMMARY OF THE INVENTION

The present invention is intended to improve the above-described video games in which scenario-based contents are developed through conversations between a player character and each mate character.

Specifically, it is an object of the present invention to provide a game-development control method and a game machine that execute a simulation video game while allowing a game player to more naturally recognize inevitability of scenario-based developments, including the relationship between a player character and each mate character, and a recording medium used with the method and the machine.

Also, it is an object of the present invention to provide a game-development control method and a game machine that allow a game player to perform smooth change of characteristics of a player character which reflect the personality of the game player so that the game player is not aware of the change in characteristics, and a recording medium used with the method and the machine.

To these ends, according to an aspect of the present invention, the foregoing objects are achieved through provision of a game-development control method for execution on a computer including a control means which displays, on a predetermined display unit, a plurality of mate characters or phenomena relating to a player character manipulated by a game player in accordance with a game scenario, and which develops a game based on the game scenario. The control means executes the steps of: dividing the game scenario into an introductory part including at least one pre-event and a subsequent main part including at least one event correlated with the one pre-event; recording, when each pre-event is generated in the introductory part, pre-event generation data generated based on the generation of each pre-event on a recording medium; and reading, when each event is generated, pre-event generation data correlated to each event among the pre-event generation data recorded in the recording medium, and reflecting the read pre-event generation data in the contents of each event.

This corresponds to a technology that executes the game, allowing the game player to naturally recognize the relationship between the player character and the mate character. In other words, according to this method, by allowing the game player to experience the pre-event through the player character in the introductory part, the game player is enabled to memorize specific settings, and in the subsequent main part, the game player is enabled to memorize an event correlated with the pre-event. According to this method, the player character experiences the pre-event correlated with the event beforehand. Thus, the need of post-explanation of the reason the event is generated and settings is eliminated, which enables the game player to accept the game settings very naturally. In the game-development control method in the Specification, the introductory part scenario can be separately created, and the introductory part can be set for only creating event data to be reflected in the contents of the main part.

The contents of the event and the pre-event may be freely set in accordance with the game scenario, and the contents of the event generated in the main part may have causality with the contents of any one of the pre-events. By setting the event and the pre-event to have the above-described relationship, the game player can intuitively understand that the event is generated because a pre-event (experienced by the game player via the player character) correlated therewith has ever occurred. Accordingly, the game player can understand settings in the scenario more naturally.

By way of example, in the game-development control method of the present invention, the introductory part scenario can be set to correspond to the childhood of the player character, and the main part scenario can be set to correspond to the youth of the player character. This is particularly effective when the present invention is applied to love-simulation games. In other words, by making the game player virtually experience, as an infant experience, the pre-event experienced in the introductory part corresponding to the childhood, and making the game player experience an event correlated with the pre-event in the main part corresponding to the youth, the infant experience the game player virtually experiences coincides with an infant experience held in accordance with settings by the player character in the game. Accordingly, the game player can more strongly feel a sense of unity with the player character, whereby the game player can be absorbed in the game scenario and can empathize with the player character without any difficulty.

The above-described method is also realized by controlling a predetermined computer, for example, a game-dedicated computer or a domestic computer to read a program code recorded on a recording medium.

According to another aspect of the present invention, the foregoing objects are achieved through provision of, as the predetermined computer, a game machine including an input unit for receiving operations from a game player; and a control unit for displaying, on a display unit, a plurality of mate characters or phenomena relating to a player character manipulated based on a game scenario by the game player. The control unit includes a scenario-control unit for dividing the game scenario into an introductory part including at least one pre-event and a subsequent main part including at least one event correlated with the one pre-event, and for developing a game based on the contents of an appropriate part of one of the introductory part and the main part, and an event-control unit for controlling the generation of each pre-event in the introductory part and recording, when each pre-event is generated in the introductory part, pre-event generation data generated based on the generation of each pre-event on a recording medium, the event-control unit also controlling the generation of each event in the main part and reading, when each event is generated in the main part, pre-event generation data correlated with each event among the pre-event generation data recorded on the recording medium, and for reflecting the read pre-event generation data in the contents of each event.

The program code in this Specification is a concept that includes data required for the game machine to execute the game, and control parameters, in addition to the program itself.

According to a further aspect of the present invention, the foregoing objects are achieved through provision of a computer-readable recording medium containing a program code for controlling a computer so that, when a plurality of mate characters or phenomena relating to a player character manipulated by a game player are displayed on a predetermined display unit in accordance with a game scenario, and the game scenario is developed, the computer executes the steps of: dividing the game scenario into an introductory part including at least one pre-event and a main part which follows the introductory part and which includes at least one event correlated with the one pre-event; recording, when each pre-event is generated in the introductory part, pre-event generation data generated based on the generation of each pre-event on a recording medium; and reading, when each event is generated, the pre-event generation data, which correspond to each event, from the recording medium, and reflecting the read pre-event generation data in the contents of each event.

This method corresponds to a technology for smoothly determining, without making the game player feeling the determination, the characteristics of the player character in which the personality of the game player is reflected. According to this method, the personality elements of the player character are determined based on pre-event generation data generated based on the type of an executed pre-event. The player character whose personality elements are determined reflecting the pre-event generation data have characteristics similar to the personality of the game player and the personality desired by the game player. Accordingly, the game player can easily empathize with the player character. The determination of the personality elements of the player character are performed based on the contents of an event generated in an introductory part temporally relating to the main part. Thus, the game player is not aware of the process of the determination, and is allowed to easily accept the determined characteristics of the player character.

In the present invention, as described above, the pre-event generation data can be used for the determination of the personality elements of the player character. By way of example, by correlating the magnitude of a change when the personality of the player character is changed with pre-event generation data, the pre-event generation data can be used for the determination of the personality elements of the player character. In addition, the pre-event generation data can be reflected in the initial values of any of the personality elements.

According to a still further aspect of the present invention, the foregoing objects are achieved through provision of a game-development control method for execution on a computer including a control unit which displays, on a predetermined display unit, a plurality of mate characters or phenomena relating to a player character manipulated by a game player in accordance with a game scenario, and which develops a game based on the game scenario. The control unit executes the steps of: dividing the game scenario into an introductory part including at least one pre-event and a subsequent main part including at least one event correlated with the one pre-event; recording, when each pre-event is generated in the introductory part, pre-event generation data generated based on the generation of each pre-event on a recording medium; and reading, when a personality element of the player character is determined in the main part, the pre-event generation data, which are correlated with the personality element, from the recording medium, and using the read data for the determination.

Preferably, the pre-event generation data are reflected in the initial value of any one the personality elements of the player character.

The above-described method of the present invention is also realized similarly to the first method by controlling a computer to read a program code recorded on a recording medium.

According to yet another aspect of the present invention, the foregoing objects are achieved through provision of a game machine including an input unit for receiving operations from a game player, and a control unit for displaying, on a display unit, a plurality of mate characters or phenomena relating to a player character manipulated based on a game scenario by the game player. The control unit includes a scenario-control unit for dividing the game scenario into an introductory part including at least one pre-event and a subsequent main part in which the scenario is developed based on a corresponding personality element of the player character having at least one personality element correlated with the pre-event, an event-control unit for controlling the generation of each pre-event in the introductory part and recording, when each pre-event is generated in the introductory part, pre-event generation data generated based on the generation of each pre-event on a recording medium, the event-control unit also controlling the generation of each event in the main part and reading, when each event is generated in the main part, pre-event generation data correlated with each event among the pre-event generation data recorded on the recording medium, and for reflecting the read pre-event generation data in the contents of each event.

According to a more aspect of the present invention, the foregoing objects are achieved through provision of a computer-readable recording medium containing a program code for controlling a computer so that, when a plurality of mate characters or phenomena relating to a player character manipulated by a game player are displayed on a predetermined display unit in accordance with a game scenario, and the game scenario is developed in accordance with operations by the game player, the program code executes the steps of: dividing the game scenario into an introductory part including at least one pre-event and a subsequent main part in which the scenario is developed based on a corresponding personality element of the player character having at least one personality element correlated with the pre-event; recording, when each pre-event is generated in the introductory part, pre-event generation data generated based on the generation of each pre-event on a recording medium; and reading, when a personality element of the player character is determined in the main part, the pre-event generation data, which are correlated with the personality element, from the recording medium, and reflecting the read data in the contents of the personality element.

DESCRIPTION OF THE PREFERRED EMBODIMENTS

Preferred embodiments of the present invention are described below with reference to the accompanying drawings.

At first, a game-machine main part which is associated with a recording medium to constitute a video game machine is described. This embodiment only describes the case where a love-simulation game is executed by the video game machine.

Figure 1:
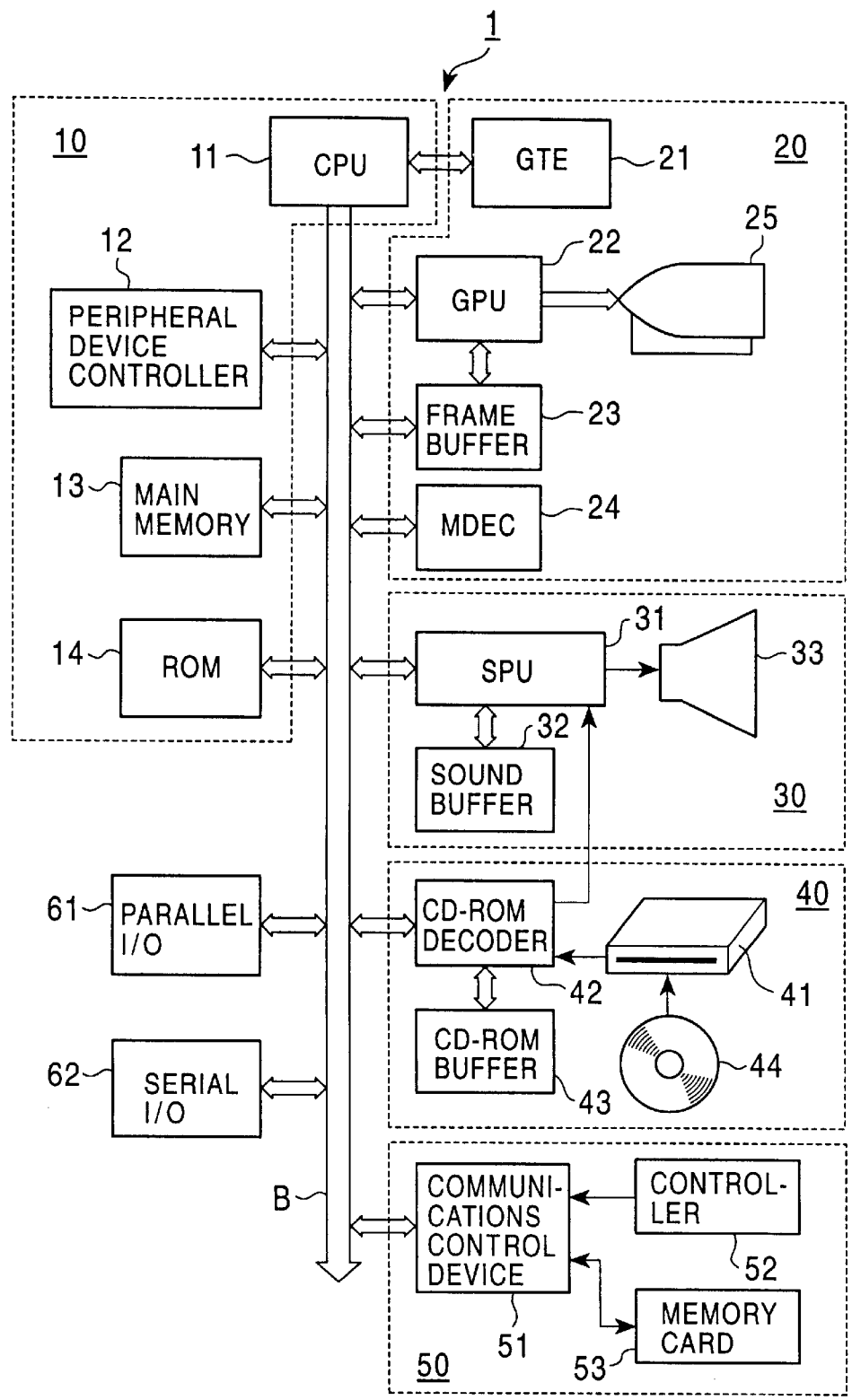
FIG. 1 is a block diagram showing a game-machine main part 1 to which the present invention is applied.

The game-machine main part reads a program code (hereinafter referred to as a "game program") for executing the game from a CD-ROM as an example of the recording medium of the present invention, and executes the game program, whereby actions of player characters and mate characters in accordance with instructions from a game player, and environments for actions of the player characters, are displayed and controlled. A specific example of the game-machine main part is as shown in FIG. 1. A game-machine main part 1 includes a main controller 10, an image processor 20, an audio processor 30, a disk controller 40, a communications control unit 50, and a main bus B for connecting the functional units 10 to 50 so as to bidirectionally communicate with one another.

The main controller 10 includes a central processing unit (CPU) 11, a peripheral device controller 12 for performing interruption control, direct-memory-access (DMA) transfer control, etc., a main memory 13 for temporarily the game program read from the CD-ROM, and a read-only memory (ROM) 14 including an operating system (OS) that controls the image processor 20 and the audio processor 30. The CPU 11 is a reduced instruction set computer (RISC). The CPU 11 controls basic operations in the entirety of the game-machine main part 1, and generates a plurality of functional blocks (described below) by executing the game program stored in the main memory 13.

The image processor 20 includes a geometry transfer engine (GTE) 21 that performs high-speed coordinate transformation, etc., on data stored in the main memory 13, a graphics processing unit (GPU) 22 that forms various game character images and environment images by rendering polygons and sprites (such as triangles and tetragons) based on rendering instructions from the CPU 11, a frame buffer 23 that stores images rendered by the GPU 22, and an image decoder (MDEC) 24 that decodes compressed image data, as required. The data rendered (stored) in the frame buffer 23 are read and displayed on a display device.

The audio processor 30 includes a sound-reproducing processing unit (SPU) 31 that generates game tones and effect sounds, a sound buffer 32 that stores data read from the CD-ROM, such as sounds and tones, and sound-source data, etc., and a speaker that outputs the tones, the effect sounds, etc., generated by the SPU 31. The SPU 31 includes, for example, an adaptive-differential-pulse-code-modulation decoding function that decodes adaptive-differential-pulse-code-modulated audio data as 4-bit differential signals obtained by performing adaptive differential pulse code modulation on 16-bit audio signals, a function of reproducing effect sounds by reading the sound source data stored in the sound buffer 32, and a modulating function of modulating the audio data stored in the sound buffer 32 for sound reproduction. These functions enable the audio processor 30 to be used as a sampling sound source that generates, in accordance with instructions from the CPU 11, tones, effect sounds, etc., based on the audio and other data stored in the sound buffer 32.

The disk controller 40 includes a disk drive 41 that reads a game program recorded on a CD-ROM 44, a CD-ROM decoder 42 that decodes data recorded with error-correction codes, and a buffer 43 that temporarily stores data read from the disk drive 41. The decoder 42 is also included in the audio processor 30.

The data that are recorded on the CD-ROM 44 and that are read by the disk drive 41 include not only the ADPCM data but also pulse-code-modulated (PCM) data obtained by performing analog-to-digital conversion on the audio signals. Audio data in the form of ADPCM data in which differences of 16-bit digital data are represented by four bits are error-corrected and decoded by the decoder 42. The error-corrected and decoded data are supplied to the SPU 31, and are processed so as to be converted from digital form to analog form. After that, the processed data are used to drive the speaker 33. An audio output from the decoder 42 is temporarily input to the SPU 31, and the sum of the audio output and an output from the SPU 31 becomes a final audio output after passing through a reverb unit.

The communications control unit 50 includes a communications control device 51 that controls communication with the CPU 11 via the main bus B, a controller 52, and a memory card 53.

A controller 52 is an interface that allows the game player to input instructions, and includes a start key for instructing the start and restart of the game, a reset key for instructing game resetting, selection keys that instruct a vertical or horizontal movement of a player character and that position a cursor on various menus and items which are displayed, and instruction keys for instructing detailed actions of the player character and designating a selected menu. The controller 52 transmits the state of each key to the communications control device 51 by synchronous communications. The communication control unit 51 transmits the state of each key of the controller 52 to the CPU 11. This transmits an instruction from the game player to the CPU 11, whereby the game-machine main part 1 can be operated in accordance with the intention of the game player.

When the CPU 11 must store settings of the game being executed and results obtained at the end or middle of the game, the CPU 11 transmits data at that time to the communications control device 51, and the communications control device 51 stores the data from the CPU 11 in the memory card 53. Since the memory card 53 is separated from the main bus B, it can be connected or disconnected, with the main power supplied to the game-machine main part 1. This enables the settings of the game, etc., to be stored in a plurality of memory cards like the memory card 53.

The game-machine main part 1 is provided with a parallel input/output (I/O) port 61 and a serial input/output (I/O) port 62 which are connected to the main bus B. The game-machine main part 1 can be connected to peripheral devices via the parallel I/O port 61, and can communicate with another video game machine via the serial I/O port 62.

Figure 2:
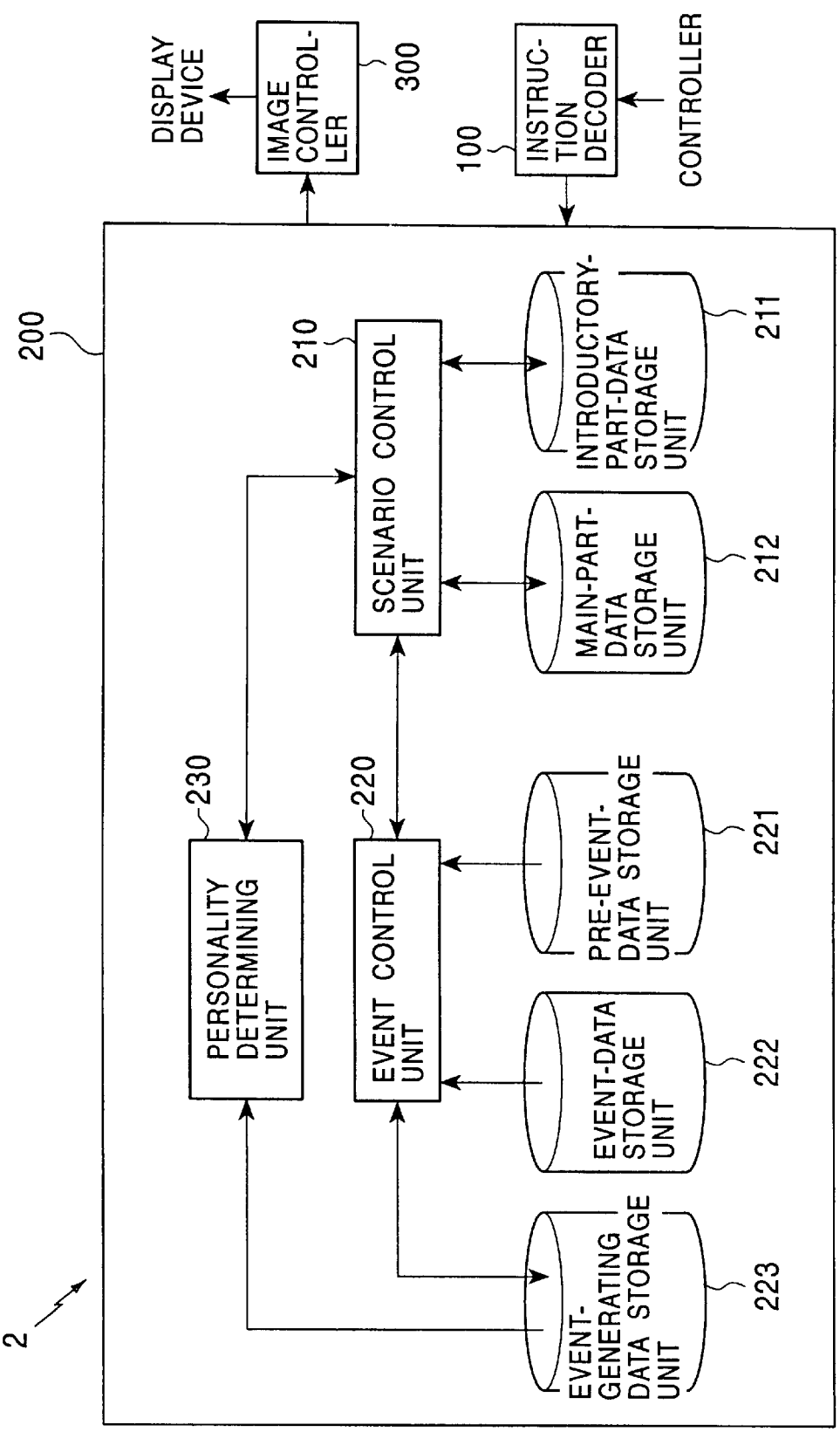
FIG. 2 is a block diagram showing a video game machine according to an embodiment of the present invention.
Figure 3:
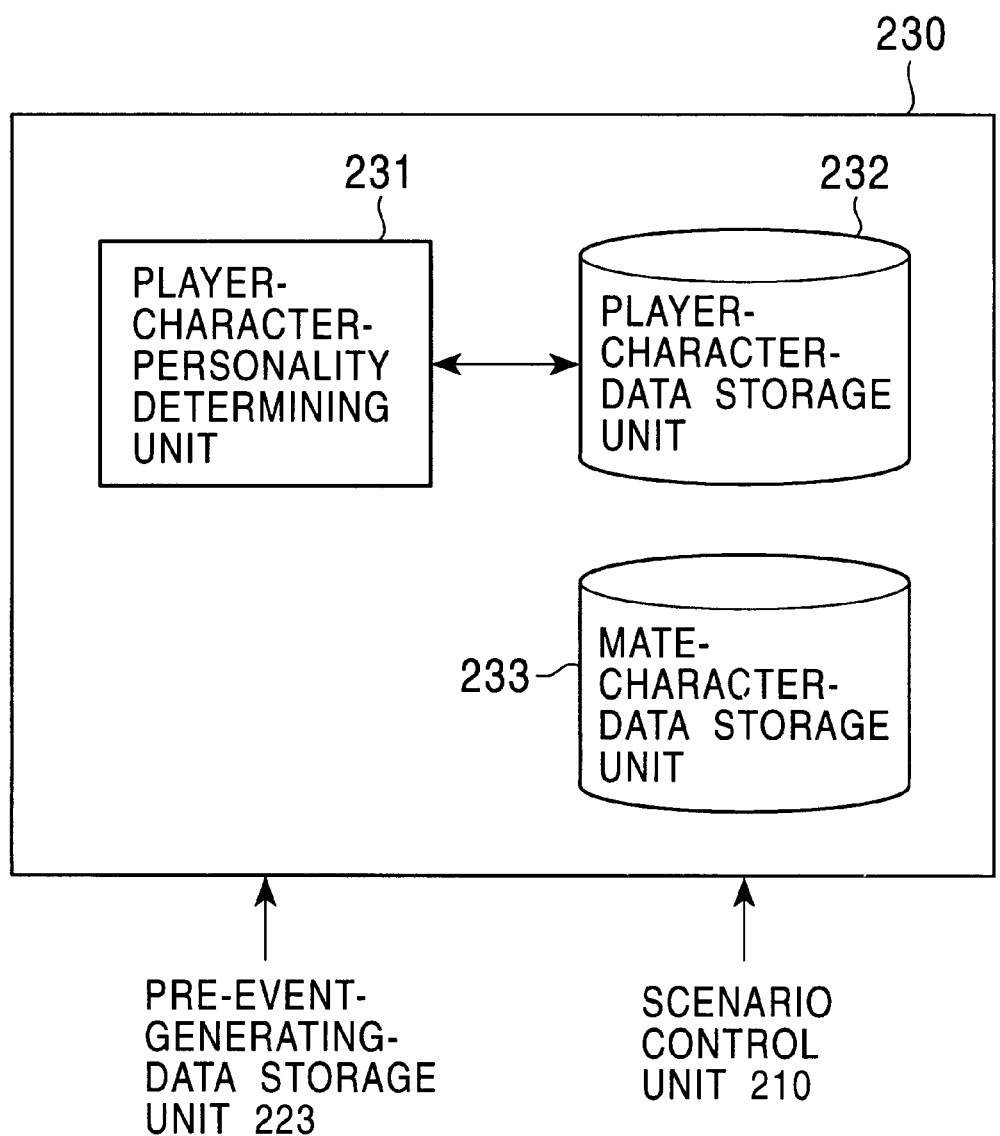
FIG. 3 is an expanded block diagram showing a personality determining unit 230 shown in FIG. 2.

When the main power is supplied to the game-machine main part 1 having the above-described construction, or reset processing is performed, with the CD-ROM 44 loaded in the disk drive 41, the CPU 11 executes the OS stored in the ROM 14, thereby performing initialization in the entirety of the game-machine main part 1, such as confirmation of operations, and controlling the disk controller 40 to read and execute the game program stored in the CD-ROM 44. By executing the game program, the CPU 11 generates functional blocks as shown in FIG. 2 and realizes a video game machine of the present invention.

The video game machine 2 includes an instruction decoder 100, a controller 200, an image controller 300 for controlling an image displayed on the display device 25.

The instruction decoder 100 decodes instructions from the controller 52, and performs control required for the instructions. The instructions includes specifying the speech of the player character (reflecting the intention of the game player) by selecting an option in addition to those essential in playing the game, such as starting the game, interrupting the game, restarting the game, ending the game, and instructing actions of the player character. At the start or restart of the game, the instruction decoder 100 establishes environment required for executing the game by loading the game program stored in the CD-ROM and data saved in the memory card 53. At the interruption or end of the game, game data such as points by characters, which have been obtained up to the time, are saved in the memory card 53.

The controller 200 includes a scenario control unit 210, an event control unit 220, and a personality determining unit 230. The controller 200 instructs the image controller 300 to display a plurality of mate characters or phenomena relating to a player character manipulated by the game player. The image controller 300 generates, on the display device 25, an image in accordance with the instruction.

The scenario control unit 210 is connected to an introductory-part-data storage unit 211 in which data on an introductory part game scenario are stored and a main-part-data storage unit 212 in which data on a main part game scenario are stored. In this construction, the scenario of the game is divided into an introductory part and a main part following the introductory part, and either the introductory part or the main part, which is appropriate, is developed.

The event control unit 220 is connected to a pre-event-data storage unit 221 in which data on a plurality of pre-events generated in the introductory part are stored, an event-data storage unit 222 in which a plurality of events generated in the main part are stored, and an event-generating-data storage unit 223 that functions as a recording medium. The event control unit 220 controls the generation of the pre-events in the introductory part and the generation of the events. When each pre-event is generated in the introductory part, the event control unit 220 generates, based on the pre-event generation, pre-event data for the generated pre-event, and records the pre-event data in the event-generating-data storage unit 223. When each event is generated in the main part, the event control unit 220 reads, from the event-generating-data storage unit 223, the pre-event data, which is correlated to the event to be generated, and generates an event reflecting the read pre-event data.

The personality determining unit 230 includes a player-character-personality determining unit 231, a player-character-data storage unit 232, and a mate-character-data storage unit 233. Based on an operation input from the controller 52 by the game player, the player-character-personality determining unit 231 changes parameters assigned to personality elements of a plurality of predetermined player characters. Data on the personality elements of the player characters are stored in the player-character-data storage unit 232. The personality elements have, for example, the following contents: the player character is or is not good at subjects of human science; the player character is or is not good at subjects of mathematics and science; the player character is or is not good at exercise; the player character has or does not have a sense of beauty; and the player character is or is not good-looking. The personality determining unit 230 reads the pre-event generation data from the pre-event-generating-data storage unit 223, and determines initial values of the personality elements in the main part so that the read pre-event generation data are reflected by the initial values. In this case, the determination of all the personality elements may not use the pre-event generation data. The mate-character-data storage unit 233 stores data on the characteristics of each predetermined mate character.

Figure 4:
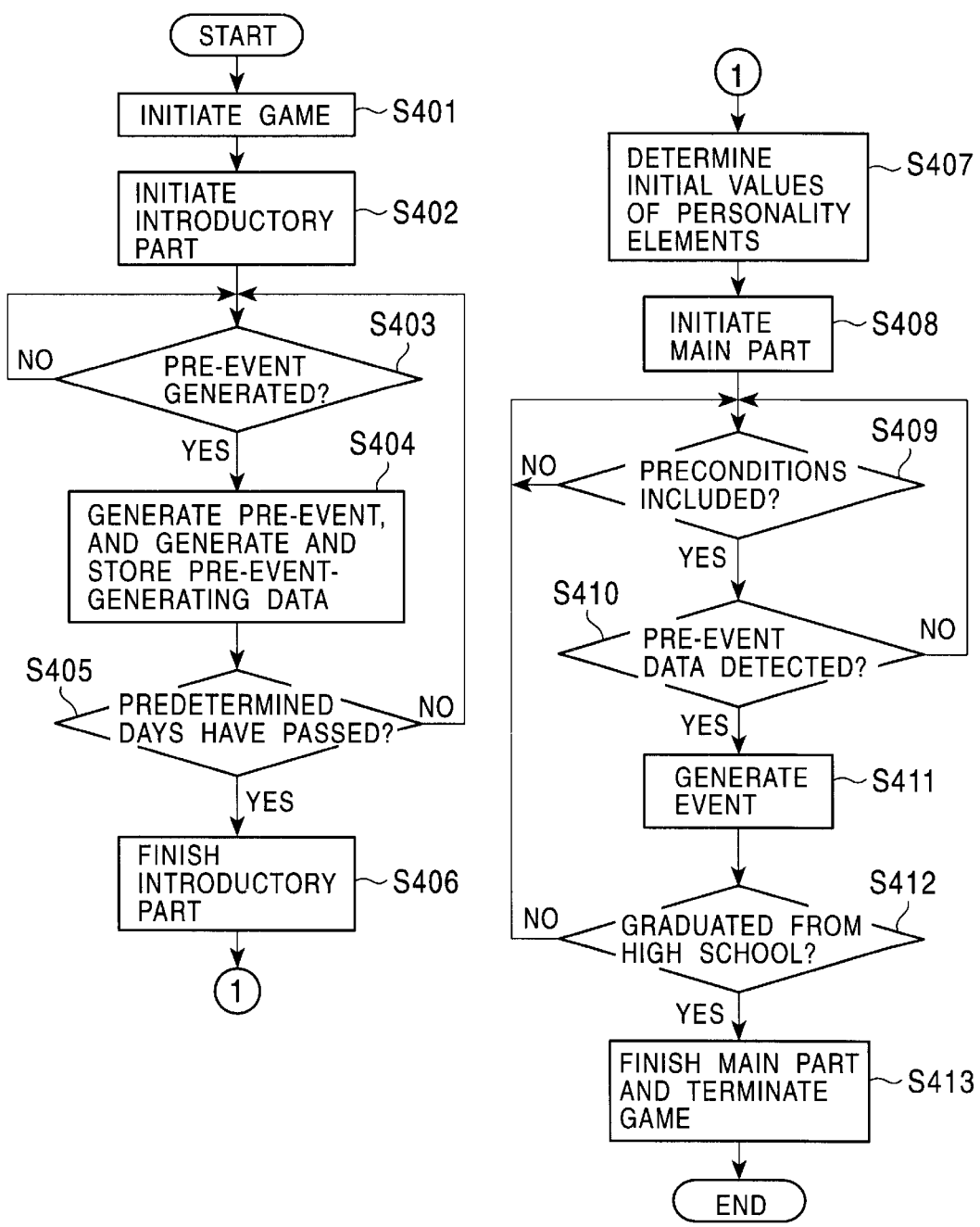
FIG. 4 is a flowchart showing a game-development control method according to an embodiment of the present invention.

A method of controlling the development of a love-simulation game for execution on the above-described video game machine 2 is described below with reference to the flowchart shown in FIG. 4.

When the game is initiated (step S401), a setting screen is displayed on the display device 25. The game player names a player character on the screen by operating the controller 52.

The introductory part is initiated (step S402). Specifically, the scenario controller 210 reads the data from the introductory-part-data storage unit 211, and develops the contents of the introductory part in accordance with a predetermined flow. The image controller 300 displays a map of a town and each mate character, which appear in the scenario. The introductory part scenario corresponds to the childhoods of the player character, which appears in the main part as a high school student experiencing virtual love, and each mate character.

When the game player operates the controller 52, the method determines in accordance with the operation whether a pre-event is generated (step S403). Each pre-event can be generated when an operation by the game player has satisfied a predetermined condition. If the predetermined condition has been satisfied ("YES" in step S403), one of pre-events is generated (step S404). If the predetermined condition has not been satisfied ("NO" in step S403), no pre-event is generated. When the pre-event is generated, the event control unit 220 generates and stores pre-event generation data on the generated pre-event in the event-generating-data storage unit 223.

In the introductory part, the player character is manipulated by the game player to wander in the town. After an elapse of predetermined days, the introductory part ends. Accordingly, the method determines whether the predetermined days have passed (step S405). If the predetermined days have passed ("YES" in step S405), the introductory part ends (step S406). If the predetermined days have not passed ("NO" in step S405), the introductory part continues.

Figure 5:
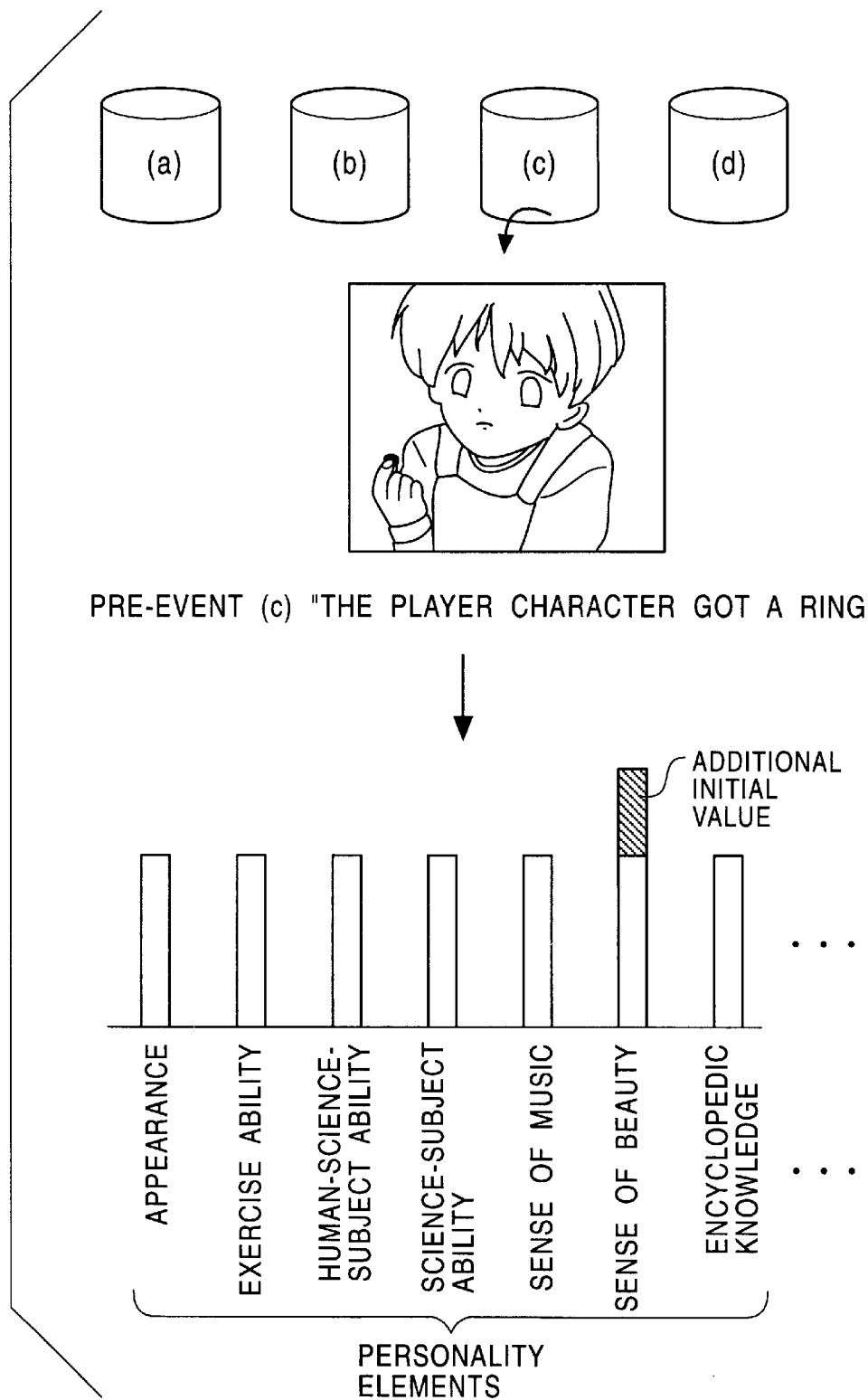
FIG. 5 is a conceptual illustration of an example of a method of determining initial values of personality elements.

After the introductory part ends, initial values of the personality elements of the player character are determined before the main part starts (step S407). The determination of the personality elements reflects the existence of the pre-event generation data. This concept is shown in FIG. 5. When a pre-event is executed which corresponds to any one type of pre-event data among a plurality of prepared pre-event data (a), (b), (c), and (d), initial values of the personality elements which correspond to the type of pre-event data can be increased or reduced. In the example shown in FIG. 5, a pre-event is executed in which the player character gets a ring for a girl. Accordingly, initial values of the personality elements relating to a sense of beauty are increased than preset basic personality elements. Referring to other examples, in the case where an event is generated in which the player character players a baseball when being a child, among the personality elements of the player character, initial values relating to exercise ability can be increased, and in the case where the player character makes a simple helicopter-like bamboo toy, initial values relating to knowledge of subjects of science can be increased.

The main part is initiated (step S408). Scenes of high school days of the player character are displayed on the display device 25. The game player uses the controller 52 to change at least one of the personality elements of the player character and to converse with the mate character. A change in the personality elements is sent through the personality determining unit 230, and is stored in the player-character-data storage unit 232. Each mate character is characterized by its personality elements, and changes its responses to the player character in accordance with the change in the personality elements of the player character. This change is managed as a parameter representing the degree of preference for the player character. By increasing or reducing the parameter, the mate character is set so as to respond favorably or unfavorably to the player character in, for example, a conversation. This enables the game player to enjoy a change in responses from the mate character.

Figure 6:
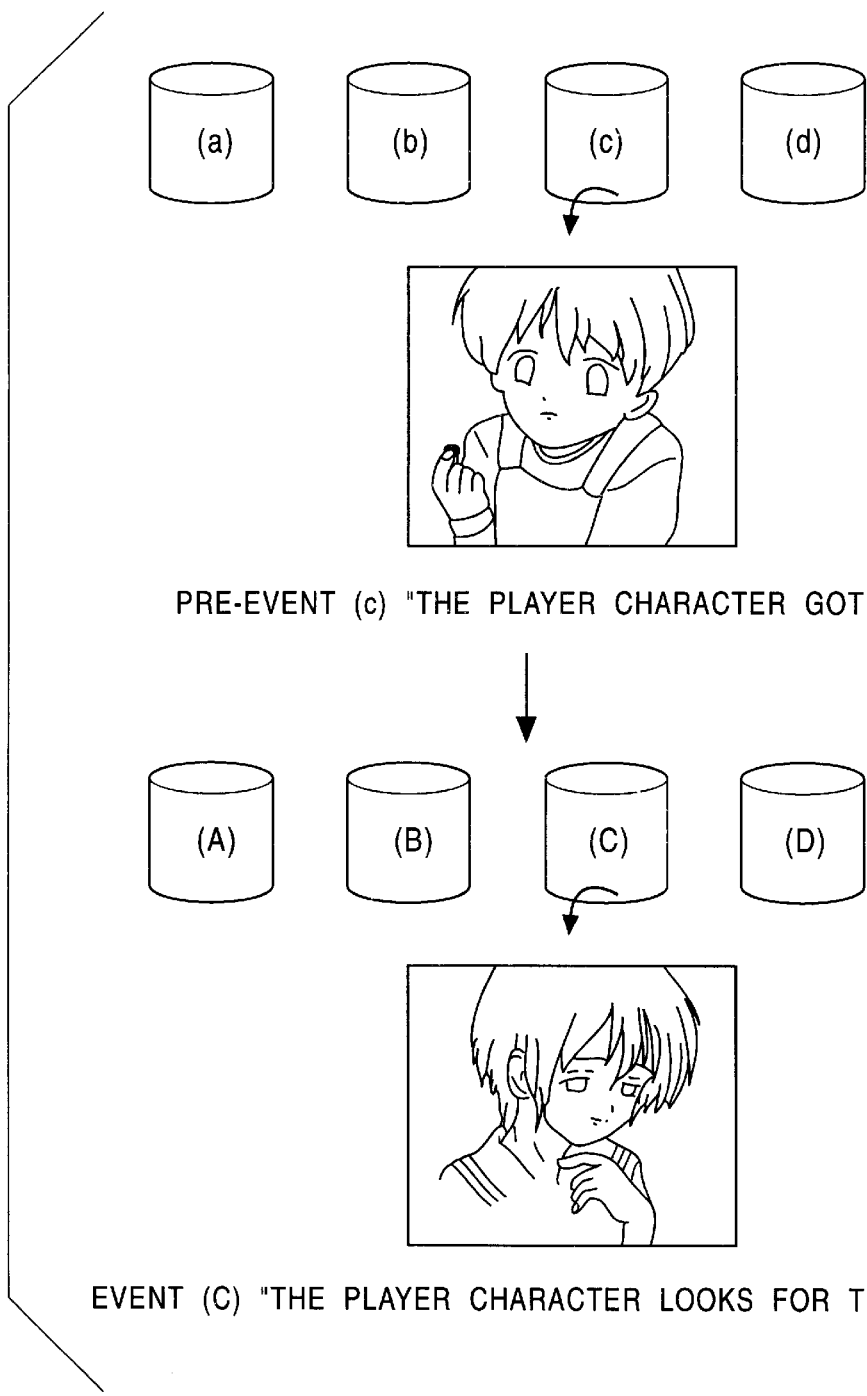
FIG. 6 is a conceptual illustration of the relationship between a pre-event and an event.

In the process of developing the main part scenario, an operation, input from the controller 52 by the game player, may allow a predetermined event to be generated. A precondition for generating the event is preset and is included in the data on the main part scenario, and the method (shown in FIG. 4) determines whether the precondition has been satisfied in the process of developing the scenario (step S409). If the precondition has been satisfied ("YES" in step S409), the method proceeds to the next step of determining whether the event can be generated (step S410). If the precondition has not been satisfied ("NO" in step S409), the game is advanced based on the normal scenario. In this embodiment, the pre-event generation data are reflected by the contents of the event in the form of whether the event should be generated. In addition, in the form of changing the contents of the event, whether the event-generating data are used can be reflected by the contents of the event. The concept of the relationship between the generation of the event and the pre-event generation data is shown in FIG. 6. Pre-event data (a), (b), (c), and (d) correspond to event data (A), (B), (C), and (D), respectively. By way of example, when a pre-event corresponding to any one type of pre-event data among pre-event data (a) to (d) is executed ("YES" in step S410), an event corresponding to the pre-event is generated (step S411). In the example shown in FIG. 5, a pre-event corresponding to pre-event data (c) is executed in which the player character got a ring for a girl, the corresponding event (C) is generated. In event (C), the girl as a mate character in pre-event (c) grows and loses the ring, and the player character looks for the lost ring with the girl. By setting causality between the pre-event and the event, the game player can instantly understand, based on memory, the reason that the event has got generated. This enables the game player to accept the event reasonably. Conversely, when no pre-event is generated ("NO" in step S410), no corresponding event is generated.

The main part scenario ends when the story reaches graduation from a high school. The method determines whether the game has proceeded up to the high school graduation in the main part scenario ("NO" in step S412), the contents of the scenario are further developed. If the game has proceeded to up to the high school graduation in the main part scenario ("YES" in step S412), a screen on which one mate character confesses its love to the player character is displayed on the display device 25, and the game is terminated (step S413).

What is claimed is:

1. A game-development control method for execution on a computer including a control means which displays, on a predetermined display unit, a plurality of mate characters or phenomena relating to a player character manipulated by a game player in accordance with a game scenario, and which develops a game based on said game scenario, wherein said control means executes the steps of:

dividing said game scenario into an introductory part including at least one pre-event and a subsequent main part including at least one event correlated with said one pre-event;

recording, when each pre-event is generated in said introductory part, pre-event generation data generated based on the generation of each pre-event on a recording medium;

reading, when each event is generated, said pre-event generation data correlated to each event among the pre-event generation data recorded in said recording medium, and reflecting the read pre-event generation data in the contents of each event; and determining initial values of the personality elements of the player character in the main part, at least one of the initial values of the personality elements of the player character is changed based on said pre-event generation data, and at least one response to the player character of the mate characters is changed in accordance with the change in the personality elements of the player character.

2. A game-development control method according to claim 1, wherein the contents of the generated event have causality with the contents of any one of the pre-events.

3. A game machine, comprising:

input means for receiving operations from a game player; and control means for displaying, on a display unit, a plurality of mate characters or phenomena relating to a player character manipulated based on a game scenario by said game player;

wherein said control means comprises:

scenario-control means for dividing said game scenario into an introductory part including at least one pre-event and a subsequent main part including at least one event correlated with said at least one pre-event, and for developing a game based on the contents of an appropriate part of one of the introductory part and the main part;

event-control means for controlling a generation of each pre-event in the introductory part and recording, when each pre-event is generated in the introductory part, pre-event generation data generated based on the generation of each pre-event on a recording medium, said event-control means also controlling a generation of each event in the main part and reading, when each event is generated in said main part, said pre-event generation data correlated with each event among the pre-event generation data recorded on said recording medium, and for reflecting the read pre-event generation data in the contents of each event; and a personality determining means for determining initial values of the personality elements of the player character in the main part, at least one of the initial values of the personality elements of the player character is changed based on said pre-event generation data, and at least one response to the player character of the mate characters is changed in accordance with the change in the personality elements of the player character.

4. A computer-readable recording medium containing a program code for controlling a computer to execute, when a plurality of mate characters or phenomena relating to a player character manipulated by a game player are displayed on a predetermined display unit in accordance with a game scenario, and said game scenario is developed, the steps of:

dividing said game scenario into an introductory part including at least one pre-event and a main part which follows said introductory part and which includes at least one event correlated with said at least one pre-event;

recording, when each pre-event is generated in said introductory part, pre-event generation data generated based on the generation of each pre-event on a recording medium;

reading, when each event is generated, the pre-event generation data, which correspond to each event, from said recording medium, and reflecting the read pre-event generation data in the contents of each event; and determining initial values of the personality elements of the player character in the main part, at least one of the initial values of the personality elements of the player character is changed based on said pre-event generation data, and at least one response to the player character of the mate characters is changed in accordance with the change in the personality elements of the player character.

5. A game-development control method for execution on a computer including a control means which displays, on a predetermined display unit, a plurality of mate characters or phenomena relating to a player character manipulated by a game player in accordance with a game scenario, and which develops a game based on said game scenario, wherein said control means executes the steps of:

dividing said game scenario into an introductory part including at least one pre-event and a subsequent main part including at least one event correlated with said at least one pre-event;

recording, when each pre-event is generated in said introductory part, pre-event generation data generated based on the generation of each pre-event on a recording medium;

reading, when a personality element of said player character is determined in the main part, the pre-event generation data, which are correlated with the personality element, from said recording medium, and using the read data determining said personality elements of said player character; and determining initial values of the personality elements of the player character in the main part, at least one of the initial values of the personality elements of the player character is changed based on said pre-event generation data, and at least one response to the player character of the mate characters is changed in accordance with the change in the personality elements of the player character.

6. A game-development control method according to claim 5, wherein the pre-event generation data are reflected in the initial value of any one of the personality elements of said player character.

7. A game machine, comprising:

input means for receiving operations from a game player; and control means for displaying, on a display unit, a plurality of mate characters or phenomena relating to a player character manipulated based on a game scenario by said game player;

wherein said control means comprises:

scenario-control means for dividing said game scenario into an introductory part including at least one pre-event and a subsequent main part in which the scenario is developed based on a corresponding personality element of said player character having at least one personality element correlated with the pre-event;

event-control means for controlling a generation of each pre-event in the introductory part and recording, when each pre-event is generated in the introductory part, pre-event generation data generated based on the generation of each pre-event on a recording medium, said event-control means also controlling a generation of each event in the main part and reading, when each event is generated in said main part, said pre-event generation data correlated with each event among the pre-event generation data recorded on said recording medium, and for reflecting the read pre-event generation data in the contents of each event; and a personality determining means for determining initial values of the personality elements of the player character in the main part, at least one of the initial values of the personality elements of the player character is changed based on said pre-event generation data, and at least one response to the player character of the mate characters is changed in accordance with the change in the personality elements of the player character.

8. A computer-readable recording medium containing a program code for controlling a computer so that, when a plurality of mate characters or phenomena relating to a player character manipulated by a game player are displayed on a predetermined display unit in accordance with a game scenario, and said game scenario is developed in accordance with operations by said game player, said program code executes the steps of:

dividing said game scenario into an introductory part including at least one pre-event and a subsequent main part in which the scenario is developed based on a corresponding personality element of said player character having at least one personality element correlated with the pre-event;

recording, when each pre-event is generated in the introductory part, pre-event generation data generated based on the generation of each pre-event on a recording medium;.

reading, when a personality element of said player character is determined in the main part, the pre-event generation data, which are correlated with the personality element, from said recording medium; and determining initial values of the personality elements of the player character in the main part, at least one of the initial values of the personality elements of the player character is changed based on said pre-event generation data, and at least one response to the player character of the mate characters is changed in accordance with the change in the personality elements of the player character.

* * * * *

UNITED STATES PATENT AND TRADEMARK OFFICE
CERTIFICATE OF CORRECTION

PATENT NO.    : 6,561,910 B1
DATED         : May 13, 2003
INVENTOR(S)   : Mikio Saito It is certified that error appears in the above-identified patent and that said Letters Patent is hereby corrected as shown below:

Column 11,
Line 44, "a personality determining means for" should be deleted.

Column 14,
Line 10, after "medium;" the period should be deleted.

Signed and Sealed this

Ninth Day of September, 2003

JAMES E. ROGAN
*Director of the United States Patent and Trademark Office*